(No Model.) 2 Sheets—Sheet 1.
J. S. GREENLEAF.
POTATO PLANTER.
No. 533,533. Patented Feb. 5, 1895.
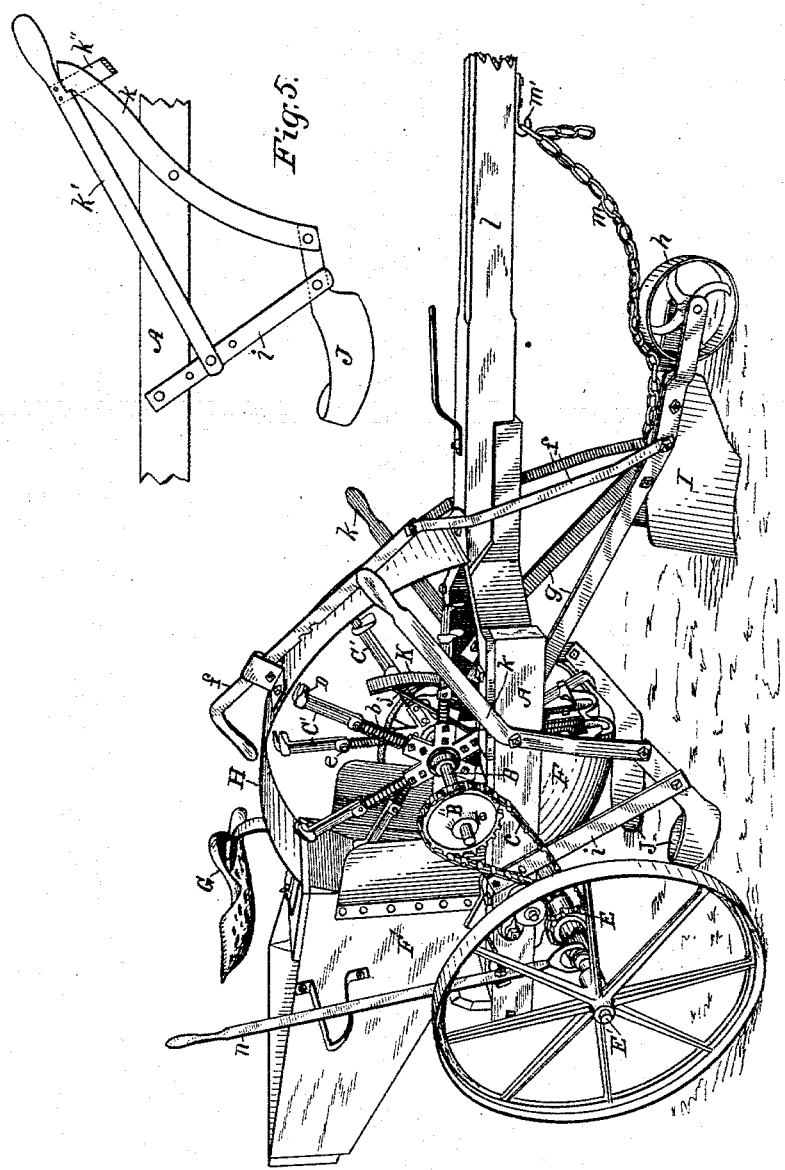
Witnesses:
Inventor,
Jonas S. Greenleaf
By Fred L. Chappell
Att'y.

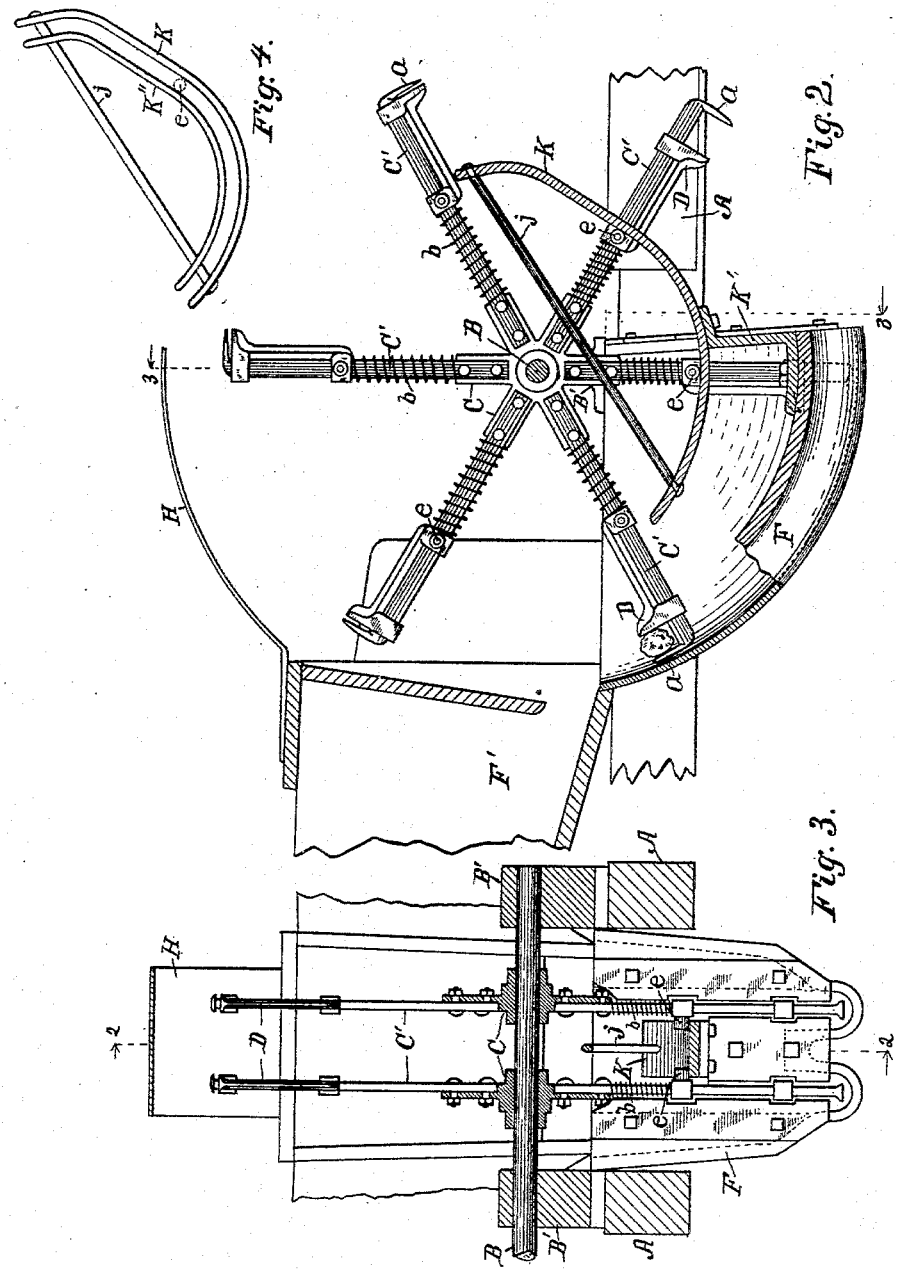

United States Patent Office.

JONAS S. GREENLEAF, OF KALAMAZOO, MICHIGAN.

POTATO-PLANTER.

SPECIFICATION forming part of Letters Patent No. 533,533, dated February 5, 1895.

Application filed April 5, 1894. Serial No. 506,409. (No model.)

*To all whom it may concern:*

Be it known that I, JONAS S. GREENLEAF, a citizen of the United States, residing at the city of Kalamazoo, in the county of Kalamazoo and State of Michigan, have invented certain new and useful Improvements in Potato-Planters, of which the following is a specification.

My invention relates to improvements in planters and more particularly to wheeled planters for planting potatoes.

The objects of my invention are, first, to provide a potato planter which shall be light and simple in construction so that a single team or even a single horse can draw it and work it properly; second, to provide, in a potato planter, an improved dropper which shall not injure or mar the potatoes or pieces of potatoes that are being planted; third, to provide, in a potato planter, improved means of adjusting the digger for the trench, and the covering plows or teeth; fourth, to provide, in a potato planter, an improved dropper so that the seed will have to drop but a very short distance so that there will be very little danger of its bounding from the furrow cut by the forward plow; fifth, to provide a potato dropper which shall drop potatoes alternately from one side to the other of the furrow; sixth, to provide, in a potato dropper, improved means of adjusting the droppers so that they will drop the potatoes a required distance apart; seventh, to provide an improved potato dropper that shall drop but one piece at a time; eighth, to provide, in a potato planter, improved coverers and means of operating them; ninth, to provide, in a potato planter, improved means of forcing the furrow plow into the earth to the required depth and maintaining it there. I accomplish these objects by the mechanism shown in the accompanying drawings, in which—

Figure 1 shows a view in perspective of my entire machine. Fig. 2 is a vertical, longitudinal, sectional view through the center of the dropper on line 2—2 of Fig. 3. Fig. 3 is a sectional view on line 3—3 of Fig. 2. Fig. 4 is a detail view of a modification of the cams which operate the picker jaws. Fig. 5 is a detail view of a modified construction of the adjusting mechanism for the coverers, J.

The sectional views are all taken looking in the direction of the little arrows at the end of the section lines.

Similar letters of reference refer to similar parts throughout the several views.

In the drawings, A represents the main frame of the machine supported on a suitable axle, E'. $l$ is the tongue projecting forward from the main frame, A. Just below and in front of the main frame, A, is the plow, I, for digging the furrow to receive the seed potatoes when they are dropped. I prefer to make this plow of vertically outwardly curved side pieces, but any other form of shovel plow can be used in this position. This plow is hinged by the arms, $g$, to the main frame, A, and is controlled to be raised up and down by the connecting bar, $f$, which is formed into a yoke to pass each side of the tongue, $l$. This connecting bar is pivoted to the plow below and controls it by being pulled back by the handle at the end and allowing the notches on the under side to drop over the bolt in the guide-way.

The small adjustable wheel, $h$, supports the front of the plow, I, and a chain, $m$, extends from the plow proper up forward to the hook, $m'$, on the under side of the tongue. This chain is to insure proper handling of the plow so that it will not strike so deep as to injure the machine. Arms, $g$, are pivoted to the frame and also attached to the plow, I, projecting downwardly and forward and being so pivoted that the tendency is to strike into the ground and maintain it there at the depth permitted by the wheel, $h$. The chain, $m$, prevents the entire plow and wheel from becoming buried in very soft ground and maintains it in its proper position, as I have stated before.

Back under the frame, A, are the coverers, J. These coverers consist of teeth, or shares, curved inwardly so as to throw the dirt back that was thrown out of the furrow by the plow, I, and so covers the potatoes. Each of these coverers, J, is pivoted to the lever, $k$, which is pivoted to the front of the frame and projects down to the front end of the coverer, J. The connecting bar, $i$, is pivoted toward the rear of the frame and extends downward and forward and is also pivoted to the coverer, J.

It will thus be seen when the lever, k, is pulled back, the tooth or coverer, J, will be raised directly up and also maintained in that position by the slight friction on the pivots of the lever and connection. When desired, any suitable detent can be substituted for the friction of the parts to hold the lever in place. At the same time, when the lever is lowered down it will be maintained in its position by the foot of the driver pressing the levers, k. It will thus be seen that these parts are easily and neatly controlled, and being held in this position by the foot of the driver, the coverers, J, readily pass over obstructions.

In Fig. 5, I show a modification of these coverers and their mechanism. The lever, k, is not provided with a handle. Another separate lever, k', is pivoted to the connection, i, and projects upward and forward, and the loop, k'', passes around the end of the lever, k. A catch on the end of the lever, k, is adapted to engage the notch on the additional auxiliary lever, k'. It will thus be seen that when this lever, k', is thrown down and forward, it will operate the lever, k, in substantially the manner shown which will force the coverer, J, down to the ground, when the catch on the lever, k, will engage with the notch on the lever, k', and will hold the coverers exactly in position without the necessity of the driver holding his feet upon the levers, k, as I above mentioned.

The dropper consists of two sets of radiating arms with jaws at the ends for picking up and dropping the potatoes. These arms are attached to the hub, C, on the same shaft, B, which is supported in suitable boxes, B', resting on the upper side of the frame, A. At the end of the shaft, B, is a sprocket wheel, B'', and on the axle, E', below is a sprocket wheel, E. A sprocket chain, c, passes from the sprocket wheel, E, up over the sprocket wheel, B'', to actuate the shaft, B, which carries the radiating arms, C', to which the dropper jaws are attached. Over the top of these radiating arms extending from the hopper, F, to the front part of the frame at the rear of the tongue, l, is a shield, H, which protects the droppers. The end of each of the radiating arms, C', is bent forward and forms the outer jaw, a. Inside of this is the inner jaw, D, which is held by suitable collars on the arms, C'. These arms, C', are riveted or bolted to the projecting, radiating arms of the hubs, C. The coiled spring, b, is situated between the collars of the jaw, D, and the projecting arms of the hub, C, and tend to force the jaw, D, out against the jaw, a. On the sides of each of each of these jaws, D, at the inner collar are located small anti-friction rollers, e. These arms, C', along with the hub, C, rotate with the axle, B, similar to wheels, the jaws projecting out.

To the rear of the machine, is located the hopper, F', which slopes from all sides toward the dropper and has an opening at its lower front side to allow the escape of a few potatoes at a time. These, as they drop out a few at a time, fall into the curved troughs or grooves, F.

Located between the rotating sets of arms, C', is the cam plate, K, which is supported by a bracket, K', projecting up from between the troughs, F. This cam, K, is braced by the rod, j, passing through it from one end to the other. This cam, K, is so situated as to engage with the small anti-friction rollers, e, on the collars of the jaws, D. The arms on these two dropper wheels alternate with each other, there being the same number on each one; and the cam plate, K, is between the two so that it engages the anti-friction rollers, e, of the dropper and so operates alternately, on each side of the machine.

When the machine is in motion, these dropper arms rotate over toward the front and down back through the troughs, F. As they pass around the anti-friction rollers, e of each pair of dropper jaws engage with the cam plate, K, and are pulled back as they pass around thus pulling the jaw, D, back from the jaw, a, and opening it until it passes into the trough or groove, F, when the cam curves out so as to allow the jaws, D, to gradually close and when the roller, e, leaves and passes, the jaws will have closed on a single piece of potato and will carry it up and allow the remaining pieces that have passed from the hopper into the troughs to drop back into the trough ready to be engaged by the next pair of jaws which, at that time, have passed into the forward part of the trough so as to prevent any of the seed escaping past them. As the jaws pass by, they still continue to hold the potato between them until they pass over to the front, when the cam, K, again engages the small rollers, e, and carries the jaw, D, back which opens the space between the two jaws and allows the potato, or piece of potato, to drop into the row.

In Fig. 4, a detail modification is shown of the cam, K, with an additional parallel cam plate, K'', which prevents any unnecessary motion of the jaws, D, from any cause. These jaws, D, when the hopper, F', is full of potatoes at the start will occasionally be pressed too wide open so that they grasp more than a single piece of potato in their operation. The extra cam plate, K'', is inserted to prevent this motion. The machine operates very well without it, but better with it.

The curved troughs, F, at the bottom of the machine are parallel to each other and the division between them is not very high so that as the arms alternate and one arm passes through the trough and carries a few potatoes on that side up and allows them to fall over into the other trough, grasping one to be carried on to be dropped, the next arm passes through the trough and carries the potatoes back to the first trough in the same way. This motion keeps the potatoes in movement and keeps them in the troughs right to be grasped by the jaws. There being two sets of these arms, operating successively and alternately, the potatoes will be dropped first to one side and then to the other of the furrow which is considered by many the best way to drop potatoes. The machine, however, can be constructed with one wheel with the dropper arms on the part making the jaws closer together, but I prefer to use the two sets of arms as I have shown.

On the main axle, E, is located a clutch, for throwing the machine in and out of gear, which is controlled by the lever, n. Above the machine is situated a driver's seat, G.

I desire to say that my improved potato planter can be greatly varied in its construction without departing from my invention. Fewer bars, or arms, C', could be employed and accomplish the purpose. Different styles of springs could be used on the jaws, and other styles of plows and coverers could be attached and would be effective with the remaining mechanism; and many other changes, which will readily occur to one skilled in the construction of this class of machinery, can be made and not depart from the main principles of my invention. The construction I have shown is preferred by me.

Having thus described my invention, what I claim as new, and desire to secure by Letters Patent, is—

1. In a potato planter, the combination of the main frame, A, supported on an axle, E; the hopper, F', to the rear of said frame, said hopper opening to the lower front side to allow the potatoes to pass; two parallel troughs, F, to receive the seed passing from said hopper; two hubs with parallel, radiating arms passing through said troughs, F; jaws at the ends of said radiating arms; a spring, b, to hold said jaws together; and an anti-friction roller, e, attached to a collar that supports the inner of said jaws; a cam plate, K, between said hubs of radiating arms to engage the anti-friction rollers, e, to operate the jaws to grasp the pototoes in the troughs, F, and carry them over and drop them in the furrows; a plow attached at the lower front end of said frame, A, to plow the furrow to receive the potatoes; and covering teeth, or arms, J, to the rear of said dropper to cover the potatoes, all co-acting and operating and formed substantially as described for the purpose specified.

2. In a potato planter, the combination of a suitable frame, supported upon an axle bearing a potato dropper; a plow, I, below and in the front of said frame and the potato dropper, to plow the furrows to receive the potatoes; and plows, J, to the rear, supported by lever, k, pivoted to the frame and connections, i, pivoted to the frame and to the plow back of said lever so that the coverers shall be controlled by the levers, k, pivoted to the side of the frame, for the purpose specified.

3. In a potato planter, the combination of a tongue, l; a frame, A, supported on the axle, E'; the plow, I, connected to the front of the frame by the downwardly and forwardly projecting arms g; a wheel, h, to the front of the plow, I, and a connection, f, passing up to each side of the tongue, l, and terminating in a handle; and a chain, m, attached to said plow and passing up and to the front of the hook, m', on the tongue l; a potato dropper to the rear of said plow to drop the potatoes into the furrow, for the purpose specified.

4. In a potato planter, the combination of a suitable furrow cutter; a suitable covering device to cover the potatoes after they are dropped; radiating arms, C', on the axle, B, which are rotated by suitable gear connection with the driving wheels of the potato planter; jaws composed of the outer stationary part, a, and movable inner part, D, attached to the outer end of said arms; and cam, K, to engage the inner jaw, D, and operate it while rotating, to open and close the jaws so as to pick up the potatoes and drop them, for the purpose specified.

5. In a potato planter, the combination with the main frame; the coverers, J, pivoted by their forward ends to the lever, k; and connecting bar, i, pivoted to said coverers back of said levers, k, extending rearwardly and pivoted to the frame; and lever, k, pivoted to the forward end of said coverers and extending forward so that by moving the top of lever, k, backward, the coverer, J, will be raised above the ground so as to be carried freely in that position.

6. In a potato planter, parallel, segmental troughs, F, to the rear of rotating droppers; the picker arm, C', radiating from the hub, C, alternating with each other and passing through the segmental trough alternately so that the potatoes in one trough will be moved into the other as the arms pass forward during the operation of the machine to keep the potatoes in motion, for the purpose specified.

7. In a potato planter, the combination with the frame of the lower parallel troughs, F; the radiating arms, C', with the picker jaws, a, D, at the ends attached to the rotating parts to pass through the troughs alternately to keep the potatoes in motion from one side to the other so that they will be in proper position to be engaged by the picker jaws to be carried out and dropped, for the purpose specified.

8. In a potato planter, the combination with the main frame, of the lever, k, and the connection, i, pivoted above to the frame, and below at points separated from each other to the coverers, J; the coverers, J, and the auxiliary lever, k, with a loop, k'', to engage the lever, k; a notch on said lever, k, to retain the lever, $k$, in position to hold the coverers down, for the purpose specified.

9. In a potato planter, the combination with the shaft, B, with radiating arms, C', bent into outer jaws, $a$, the jaws, D, inside of said jaws, $a$, and movable along said arms, C'; and friction rollers, $e$, attached to said jaws, D, and cam plates, to engage said anti-friction rollers, $e$, to operate the jaws, substantially as described for the purpose specified.

In witness whereof I have hereunto set my hand and seal in the presence of two witnesses.

JONAS S. GREENLEAF. [L. S.]

Witnesses:
MARIAN LONGYEAR,
WALTER S. WOOD.